United States Patent
Kim et al.

(10) Patent No.: US 8,130,820 B2
(45) Date of Patent: Mar. 6, 2012

(54) METHOD AND APPARATUS FOR INTERFERENCE CANCELLATION IN A WIRELESS COMMUNICATIONS SYSTEM

(75) Inventors: Byoung-Hoon Kim, San Diego, CA (US); Manuel Flury, Aesch (CH)

(73) Assignee: QUALCOMM Incorporated, San Diego, CA (US)

( * ) Notice: Subject to any disclaimer, the term of this patent is extended or adjusted under 35 U.S.C. 154(b) by 1101 days.

(21) Appl. No.: 11/365,064

(22) Filed: Feb. 28, 2006

(65) Prior Publication Data
US 2008/0019434 A1    Jan. 24, 2008

Related U.S. Application Data (60) Provisional application No. 60/657,957, filed on Mar. 1, 2005.

(51) Int. Cl.
H04B 1/10 (2006.01)

(52) U.S. Cl. ........ 375/232; 375/231; 375/233; 375/148; 375/346; 375/347; 375/348; 375/350; 375/260; 375/262; 375/267; 375/269

(58) Field of Classification Search .................. 375/242, 375/316, 146–148, 346–350, 260, 262, 267, 375/269; 370/203, 204, 205, 206, 208, 209, 370/210

See application file for complete search history.

(56) References Cited

U.S. PATENT DOCUMENTS

| | | | |
|---|---|---|---|
| 5,867,483 A | | 2/1999 | Ennis, Jr. et al. |
| 7,006,811 B2 * | | 2/2006 | Pukkila ..................... 455/278.1 |
| 7,266,168 B2 * | | 9/2007 | Kwak et al. ................... 375/347 |
| 7,386,277 B2 * | | 6/2008 | Cho et al. ....................... 455/69 |
| 7,392,012 B2 * | | 6/2008 | Oh et al. ......................... 455/39 |
| 2002/0159507 A1 * | | 10/2002 | Flaig et al. .................... 375/148 |

FOREIGN PATENT DOCUMENTS

| WO | 02/33838 | 4/2002 |
|---|---|---|
| WO | 2004088856 | 10/2004 |

OTHER PUBLICATIONS

International Search Report-PCT/US2006/007455-European Patent Office, Aug. 18, 2006.
International Preliminary Report on Patentability-PCT/US2006/007455-The International Bureau of WIPO, Geneva, Switzerland, Sep. 11, 2007.
Written Opinion-PCT/US2006/007455-European Patent Office, Berlin, Aug. 18, 2006.
Rao et al. "A Successive Interference Cancellation Multiuser Detector for MIMO CDMA Systems." Vehicular Technology Conference, 2003. VTC 2003-Fall. 2003 IEEE 58$^{th}$ Orlando, FL, USA Oct. 6-9, 2003, Piscataway, NJ, USA, IEEE, US, Oct. 6, 2003, pp. 1075-1079.

(Continued)

Primary Examiner — Dhaval Patel
(74) Attorney, Agent, or Firm — James K. O'Hare (57) ABSTRACT

Successive interference cancellation is performed with improved computational efficiency while offering performance approaching that of full CRC-based successive interference cancellation. In a "blind" interference cancellation technique, reconstructed streams are used for interference cancellation without regard to whether the reconstructed streams were properly decoded. In a "semi-blind" interference cancellation technique, decoder outputs from linear equalization can be used instead of decoder outputs from successive interference cancellation in those cases where linear equalization produces accurate decoding but successive interference cancellation does not.

11 Claims, 7 Drawing Sheets

OTHER PUBLICATIONS

Marinkovic et al. "Space-Time Iterative and Mulitstage Receiver Structures for CDMA Mobile Communication Systems." VTC 2001 Spring. IEEE VTS 53$^{rd}$. Vehicular Technology Conference. Rhodes, Greece, May 6-9, 2001, IEEE Vehicular Technology Conference, New York, NY: IEEE, US, vol. 3 of 4. Conf. 53, May 6, 2001, pp. 1799-1803.

Li et al. "MIMO-OFDM for Wireless Communications: Signal Detection with Enhanced Channel Estimation." IEEE Transactions on Communications, IEEE Service Center, Piscataway, NJ, US, vol. 50, No. 9, Sep. 2002, pp. 1471-1477.

Higuchi et al. "Multipath Interference Canceller for High-Speed Packet Transmission with Adaptive Modulation and Coding Scheme in W-CDMA Forward Link." VTC 2001 Spring. IEEE VTS 53$^{rd}$. Vehicular Technology Conference. Rhodes, Greece, May Conference, New York, NY: IEEE, US, vol. 3 of 4. Conf. 53, May 6, 2001, pp. 2297-2301.

* cited by examiner

007
METHOD AND APPARATUS FOR INTERFERENCE CANCELLATION IN A WIRELESS COMMUNICATIONS SYSTEM

CLAIM OF PRIORITY UNDER 35 U.S.C. §119

The present application for Patent claims priority to Provisional Application No. 60/657,957 entitled "METHOD AND APPARATUS FOR INTERFERENCE CANCELLATION IN A WIRELESS COMMUNICATIONS SYSTEM" filed Mar. 1, 2005, and assigned to the assignee hereof and hereby expressly incorporated by reference herein.

BACKGROUND

1. Field

The present invention relates generally to wireless communications, and more specifically to interference cancellation.

2. Background

There exist many techniques to share a communications channel among multiple users. Examples of these techniques include code division multiple access (CDMA), orthogonal frequency-division multiplexing (OFDM), time division multiple access (TDMA), and others.

In some communications systems, such as CDMA, the multiple data streams from multiple users (or even a single user) are superposed on each other and received simultaneously. Interference is generated from the superposition of these multiple data streams. To decode a particular data stream for a user, the data stream can be decoded by treating the other data streams as uncorrelated noise. In some systems, as data streams are decoded they are reconstructed and fed back to subtract their contribution to the superposed or aggregated received signal before decoding of subsequent data streams. This technique is known as successive interference cancellation and can improve the utilization of a channel.

Present techniques for successive interference cancellation can be impractical to implement. For example, before all the signals may be decoded, a relatively large amount of data must typically be stored in a buffer. The size of this buffer can be economically impractical due to cost and power. Furthermore, it can be time-consuming and computationally complex to evaluate a relatively large amount of data. In addition, interference cancellation techniques can worsen interference when implemented in a high error rate environment. For example, a data stream that is improperly decoded and used in interference cancellation has the potential for increasing the number of errors when decoding the next successive data stream. In addition, in some systems, such as systems using a type II hybrid forward error correction/automatic repeat request (Type II Hybrid FEC/ARQ or "HARQ"), multiple data sub-packets with different puncture patterns are serially sent to the receiver and stored there. Several stored sub-packets may be combined in the receiver before the data is correctly decoded. Interference caused by a given sub-packet, once properly decoded, should not only be canceled from a current stream but also from prior streams stored in memory for which it interfered. The amount of memory consumed for storage of prior transmissions of sub-packets can be relatively large, particularly when used with multiple-input multiple-output (MIMO) systems. In addition, the task of managing these streams of data can be very complex and difficult to implement in practice. For these and other reasons, present techniques for successive interference cancellation are inadequate.

SUMMARY

In one embodiment, the invention includes an apparatus having a receiver/equalizer having $N_r$ signal inputs and $N_t$ signal outputs, each of the $N_t$ signal outputs corresponding to one of $N_t$ data streams sent by one or more transmit antennas. A decoder is configured to detect and decode the $N_t$ signal outputs to reproduce the $N_t$ data streams; and an interference cancellation feedback loop is configured to successively cancel interference produced in an n-th data stream by decoded data stream 1 through decoded data stream n−1. Decoded data stream 1 through decoded data stream n−1 are utilized for interference cancellation decoding of data stream n whether or not one or more of decoded data stream 1 through decoded data stream n−1 pass an error checking process.

In another embodiment, an apparatus includes a receiver/equalizer having M signal inputs and N signal outputs, each of the N signal outputs corresponding to one of N received data streams and a decoder configured to detect and decode the N signal outputs from the equalizer to reproduce the N data streams. Furthermore, an interference cancellation feedback loop is provided that is configured to successively cancel interference produced in an n-th data stream by decoded data stream 1 through decoded data stream n−1. The decoder is configured to detect and decode all of the N signal outputs using linear equalization without interference cancellation and to store the results of the linear equalization decoding; the decoder is further configured to successively detect and decode stream 2 through stream N of the data streams with interference cancellation. In addition, the decoder is configured to select for interference cancellation stored data that was decoded without interference cancellation, if the stored data passes an error checking process and if corresponding data decoded with interference cancellation does not pass an error checking process.

In another embodiment, a method of decoding N received data streams superposed on one another includes performing successive interference cancellation decoding to decode at least some of the N data streams regardless of whether or not the successive cancellation decoding is in error.

In still another embodiment, a method of reducing error propagation in a successive interference cancellation receiver includes attenuating an interference feedback signal by a multiplicative factor of between 0 and 1.

Communication systems in accordance with embodiments of the invention may include a transmitter apparatus comprising two or more antennas configured to transmit respective data streams, a receiver apparatus comprising one or more antennas configured to receive the respective data streams, and a equalization and decoder circuitry configured to receive signals from the one or more antennas and produce respective streams of decoded output data. In these embodiments, a successive interference cancellation feedback loop is provided that is configured to perform interference cancellation using streams of decoded output data that do not pass an error checking process.

In another embodiment, a communication apparatus includes one or more antennas, an equalizer, a decoder, and means for performing successive interference cancellation using received data streams that do not pass an error checking process.

BRIEF DESCRIPTION OF THE DRAWINGS

These drawings and the associated description herein are provided to illustrate specific embodiments of the invention and are not intended to be limiting.

DETAILED DESCRIPTION

Figure 1:
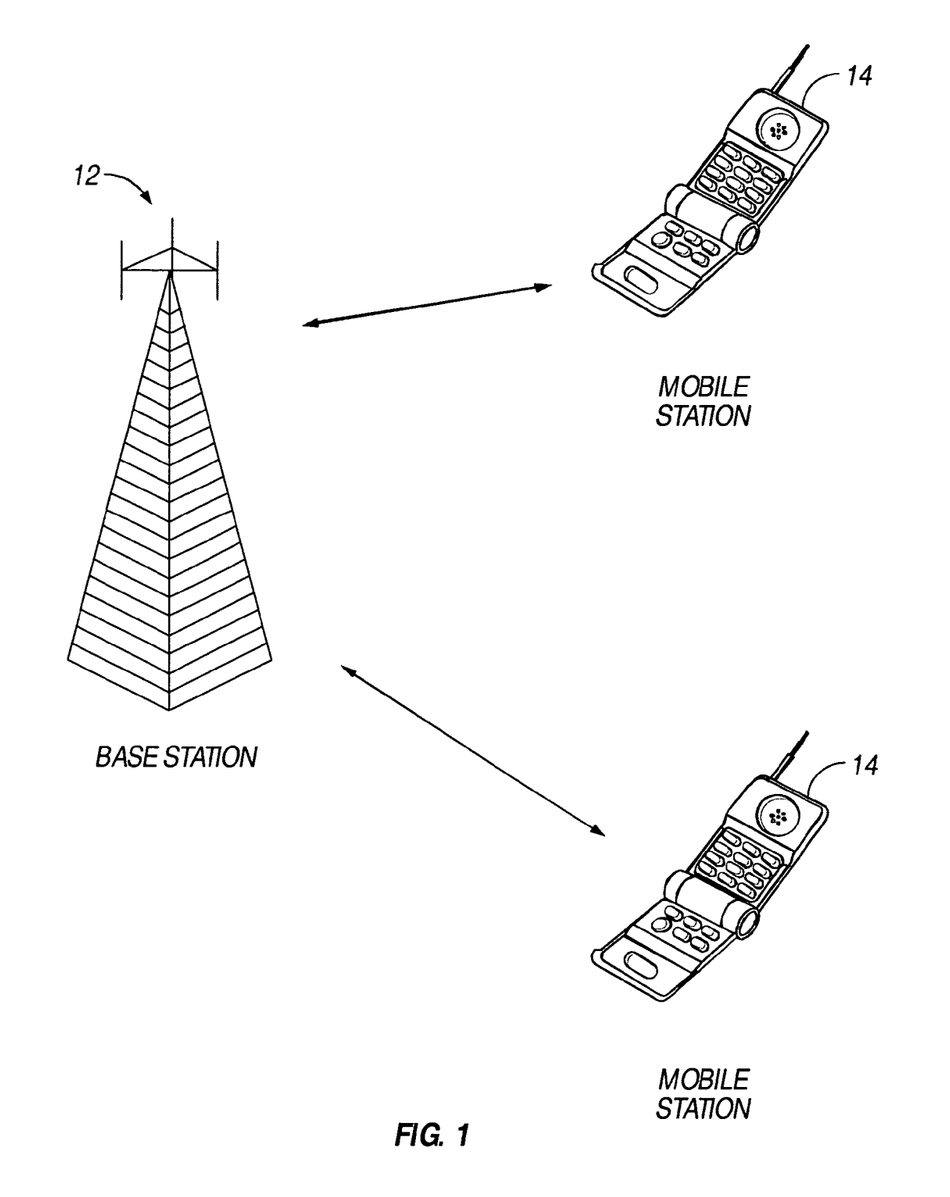
FIG. 1 is an example of a system in which an embodiment of the invention can be practiced.

FIG. 1 is an example of a system in which an embodiment of the invention can be practiced. A base station 12 transmits data intended for a plurality of mobile stations 14, such as cell phones, notebook computers, personal digital assistants (PDAs), wireless email devices, or other wireless voice and/or data devices. Other terms used to describe a mobile station 14 include "remote station" or "subscriber station." A wide variety of types of data can be communicated, including, but not limited to, system information, voice data, graphics, email messages, multi-media, information for files, and the like.

Figure 2:
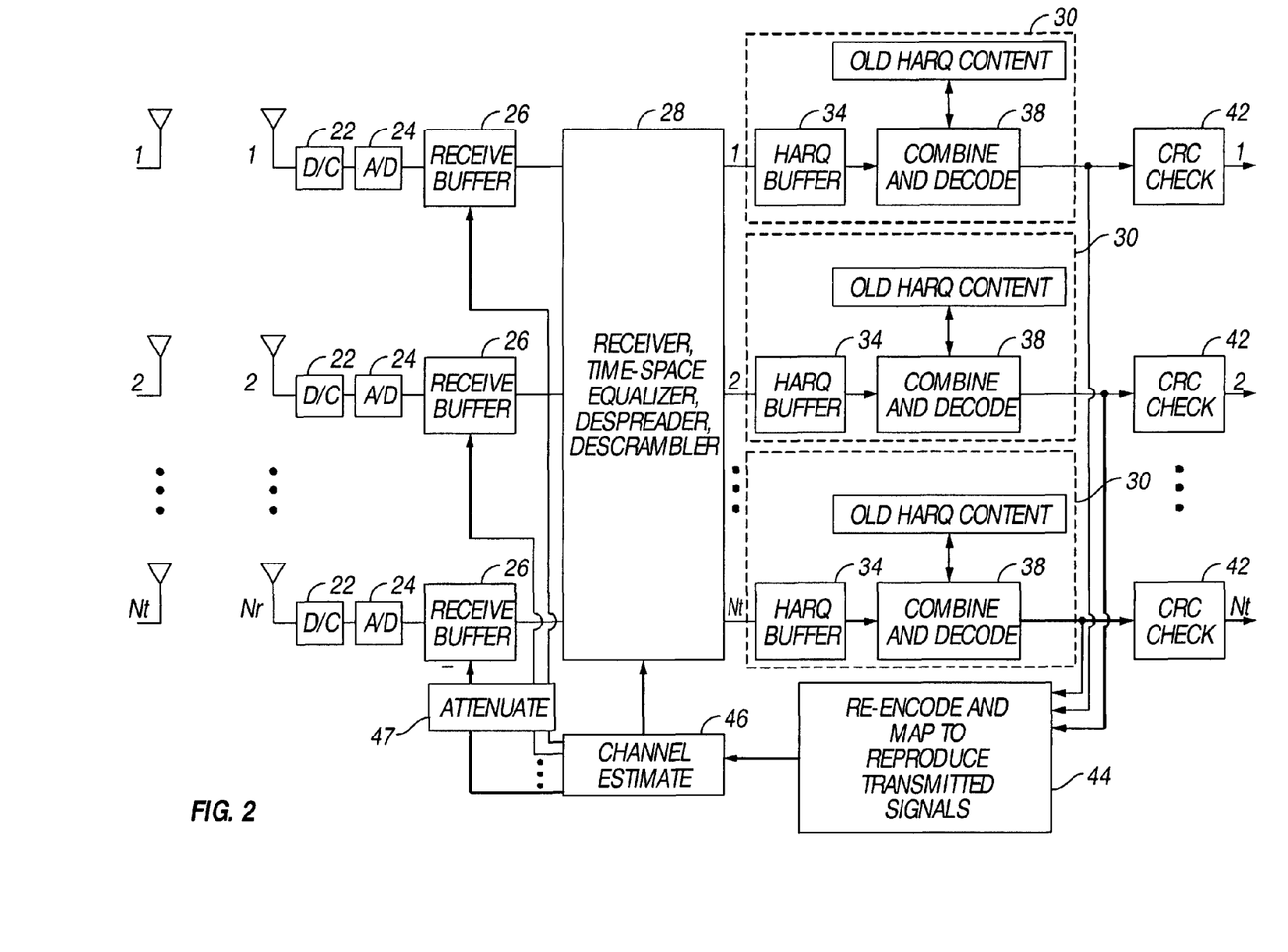
FIG. 2 is an example of a system for blind successive interference cancellation (SIC) illustrated in the context of a system with $N_t$ transmit antennas and $N_r$ receive antennas.

Various embodiments will be described in the context of a system with receive diversity and transmit diversity, known as multiple input multiple output or "MIMO" channels. However, the advantages described herein can also be applied to single input multiple output (SIMO) channels or to multiple input single output (MISO) channels, as well as to non-diversity antenna systems. FIG. 2 is an example of a system for successive interference cancellation (SIC) illustrated in the context of a system with $N_t$ transmit antennas and $N_r$ receive antennas. Each of $N_t$ and $N_r$ can be one or more antennas. The transmitted streams of data from each of the $N_t$ antennas are superposed in space and time and received at each of the $N_r$ receive antennas. A data stream or "stream," is used herein to refer to data transmitted from a particular transmitter antenna. In some embodiments, a stream of data can correspond to one or more sequentially transmitted sub-packets of data for an independent type II hybrid forward error correction/automatic repeat request (HARQ) process.

Multiple transmit antennas are commonly encountered in mobile systems, with each individual mobile station 102 contributing a transmitting antenna. Systems such as MIMO, MISO, and SIMO systems can include multiple antennas without multiple users as the spatial diversity with multiple antennas improves reception characteristics, such as the effective channel utilization capacity. In addition, while illustrated as distinct parallel circuits for ease of explanation, some or all of the blocks of FIG. 2 can be reused, and are typically performed as digital data processing functions by firmware in a general purpose digital signal processor or the like. It will be appreciated that the receiver system of FIG. 2 can be implemented in a base station 12, a mobile station 14, or both.

Each received stream from each of the $N_r$ receive antennas is downconverted by a demodulator 22 from RF to baseband (or to an intermediate frequency (IF) band), and then is converted to digital form by analog-to-digital (A/D) converters 24 for storage. Such downconversion processes can also include low-pass or band pass filtering stages and low-noise amplifiers. Sample buffers 26 for each of the $N_r$ receive antennas store digital data corresponding to the superposed streams as received at each antenna. As each of the $N_t$ transmitted streams is superposed in space and time, the $N_r$ transmitted streams interfere with each other. As set forth further below, after data for one of the $N_t$ transmitted streams is decoded, the transmitted stream can be reconstructed and the corresponding interference removed from the sample buffers 26 through the path indicated with the minus sign (−).

A time-space receiver/equalizer 28 comprises a filter with weights determined from the channel characteristics from each transmit antenna to each receive antenna. The receiver/equalizer 28 has $N_r$ inputs and $N_t$ outputs. The receiver/equalizer 28 is typically a minimum mean squared error (MMSE) filter, but other filters can be used.

The soft decision outputs of the receiver/equalizer 28 are provided as inputs to decoding circuits 30 and the data is provided to a HARQ memory 34 with function as described above. The contents of the HARQ memory 34 correspond to the recently transmitted sub-packet. This data is combined with previously received sub-packets that did not result in successful decoding (if there are any), and the decoding process is performed on the combined HARQ sub-packets.

The data combiner/decoder 38 can include detection circuits for slicing into hard symbols, forward error correction decoding, and the like. For example, decoding of forward error correction codes can include techniques such as the Viterbi algorithm to decode a convolutional code. Following decoding, an error checking circuit 42 determines whether the decoded data was successfully decoded. For example, the error checking circuit 42 can use a cyclic redundancy code (CRC).

As illustrated in FIG. 2, successive interference cancellation may in some embodiments be performed without validation that the hard symbols were properly decoded. This process is referred to herein as "blind" interference cancellation, and is distinct from conventional interference cancellation, which is performed only when the hard symbols have been determined to be correctly decoded.

As each transmitted stream is decoded, the hard decision output is fed to a signal reconstruction circuit 44. The signal reconstruction circuit 44 reconstructs the encoded and modulated data as it was transmitted by each transmit antenna using the decoded hard decision data. Using channel transfer function estimates for each transmit path (represented by block 46), each successive signal approximately as it appeared at each of the receive antennas is re-created, and subtracted from the data in the sample buffers 26 before decoding the next successive stream.

In one embodiment, the interference cancellation that is performed without validation of proper decoding is attenuated before subtraction from the sample buffers. This can attenuate error propagation that can result from subtraction of improperly reconstructed signals. In one embodiment, prior to subtraction, the reconstructed stream is attenuated by multiplier 47 with a reliability factor between 0 and 1, which can be inclusive of 0 and 1. The reliability factor can be adaptively changed based on monitoring of the accuracy of the decoding. This can reduce error propagation if the feedback signal is created with incorrect decoded data.

In the embodiment of FIG. 2, regardless of whether the CRC indicates a successful match, the decoded hard symbols are processed and used in successive interference cancellation. This technique is referred to as "blind cancellation" herein. While this technique may not provide perfect interference cancellation, it can nonetheless provide interference cancellation decoding benefits. This can dramatically simplify the construction of the successive interference cancellation circuit and/or reduce the processing load for successive interference computation, and can make implementation practical, especially when used in conjunction when a HARQ communication protocol is implemented. By contrast, a conventional interference cancellation scheme only uses the decoded hard symbols when the decoded hard symbols pass the CRC check, which has the potential to provide more accurate interference cancellation, but which can also take significantly more complex processing to cancel out interference in multiple prior saved streams, and consume significantly more memory.

When the cancellation is performed without passing a CRC check, it is advantageous for the transmitter to conservatively control the data rate so that the first sub-packet error probability is relatively low. In this case, the bit error rate is typically small even if a frame fails the CRC check, therefore limiting error propagation from incorrect decoding, which is important to achieving good results with a blind cancellation process. This can be accomplished when the communication system uses adaptive modulation and coding where the rates of all the streams can be adjusted independently. Conservative data rates can also be controlled by the receiver if the receiver reports the channel quality index (CQI) conservatively so that the individual sub-packet error probability is low.

Figure 3:
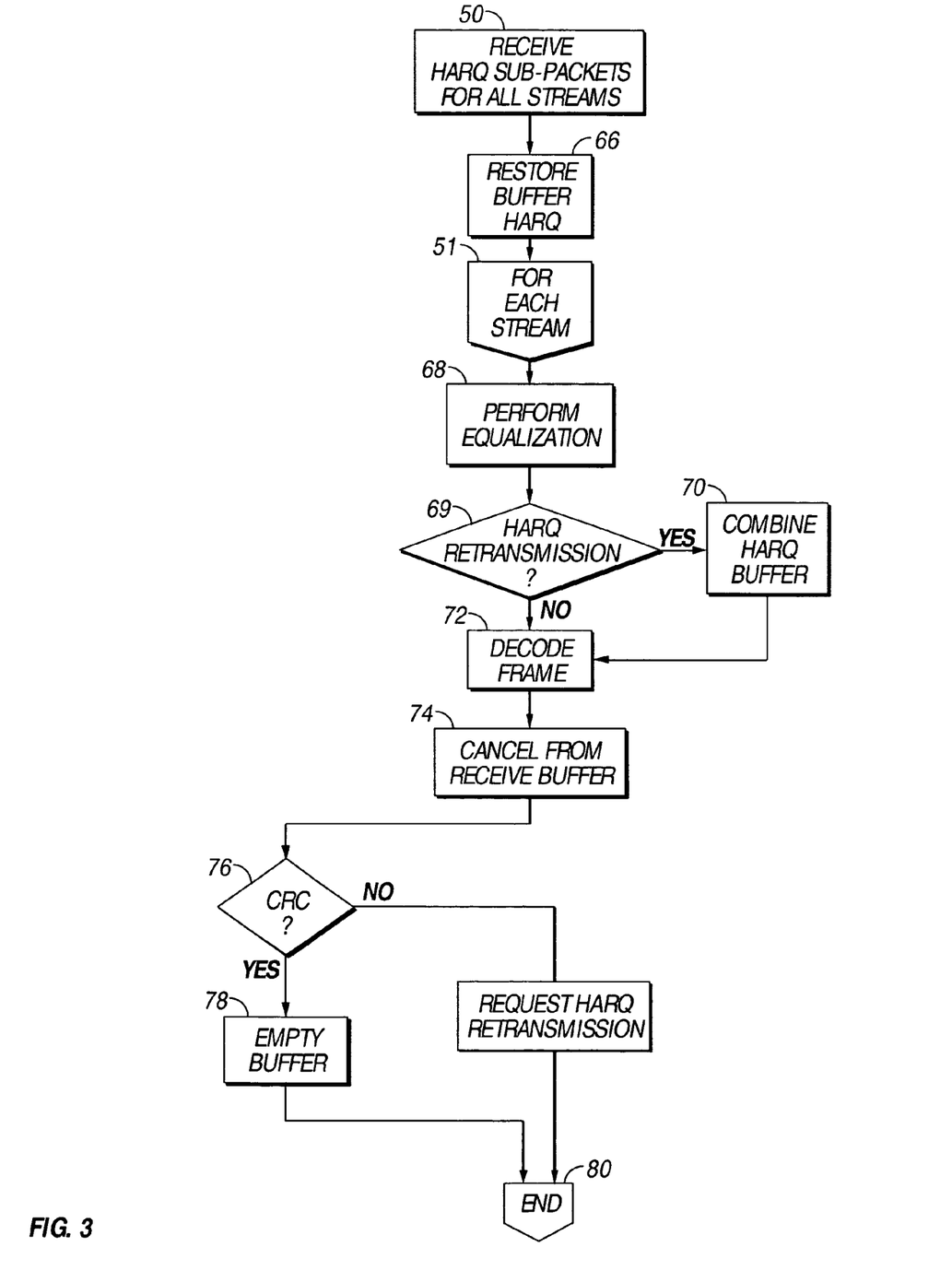
FIG. 3 is a flowchart illustrating a blind interference cancellation technique according to one embodiment of the invention.

FIG. 3 is a flowchart illustrating a "blind" interference cancellation technique according to one embodiment of the invention. Processes illustrated herein can be modified in a variety of ways without departing from the spirit and scope of the invention. For example, various portions of the illustrated processes can be combined, can be rearranged in an alternate sequence, can be removed, and the like.

The process starts by receiving data at block 50. As illustrated at 51, the following steps of the flowchart of FIG. 3 are performed successively on each stream. Equalization is performed on the raw data samples at block 68, producing a set of soft symbols for the stream. In this example, received data packets are related to a HARQ process, and thus some received data may comprise a HARQ retransmission. This is determined at step 69. If it is a HARQ retransmission, the HARQ content previously stored for a stream is combined with the recently received HARQ sub-packet at block 70. After the HARQ data for the stream is appropriately combined where necessary, the frame is decoded at block 72. The decoded hard symbols are re-encoded and subtracted from the receive buffers at block 74 without checking if the frame passed the CRC check. At block 76, the CRC check is performed. If the frame passes, the HARQ buffers are emptied for the stream at block 78, the system will typically send an acknowledgement "ACK" to the transmitter to indicate the successful receipt of the frame, and the process moves to an end state 80. If the CRC does not pass, the receiver may request a subsequent HARQ sub-packet at block 77, and the system proceeds to the end state 80, ready for additional data reception.

Figure 4:
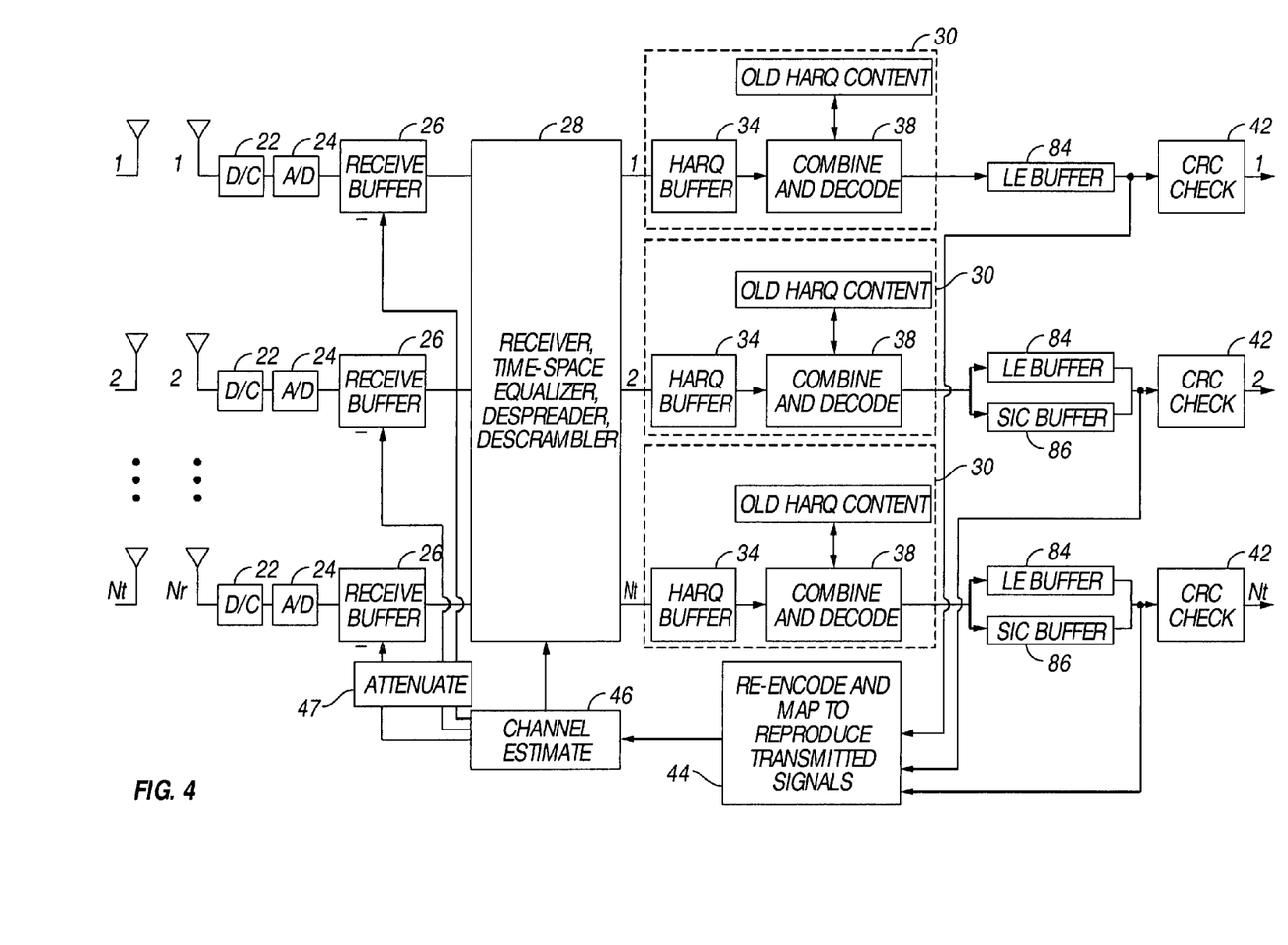
FIG. 4 is a first example of a system for semi-blind successive interference cancellation (SIC) illustrated in the context of a system with $N_t$ transmit antennas and $N_r$ receive antennas.

FIG. 4 illustrates an implementation of interference cancellation according to a second embodiment of the invention. In this embodiment, in addition to the components described with reference to FIG. 2 above, the system retains in a memory storage location both the decoder output following linear equalization only and also the decoder output following successive interference cancellation. The storage location of the linear equalized decoder output is designated 84, and the successive interference cancellation processed decoder output is designated 86. This can be useful as interference cancellation sometimes produces worse results than no interference cancellation. The apparatus of FIG. 4 can be used to select the better of interference cancellation or no interference cancellation when one is known to have worked better as indicated by an error checking process. This approach may be useful especially when the system uses a simple error correction code which needs low decoding complexity.

Figure 5:
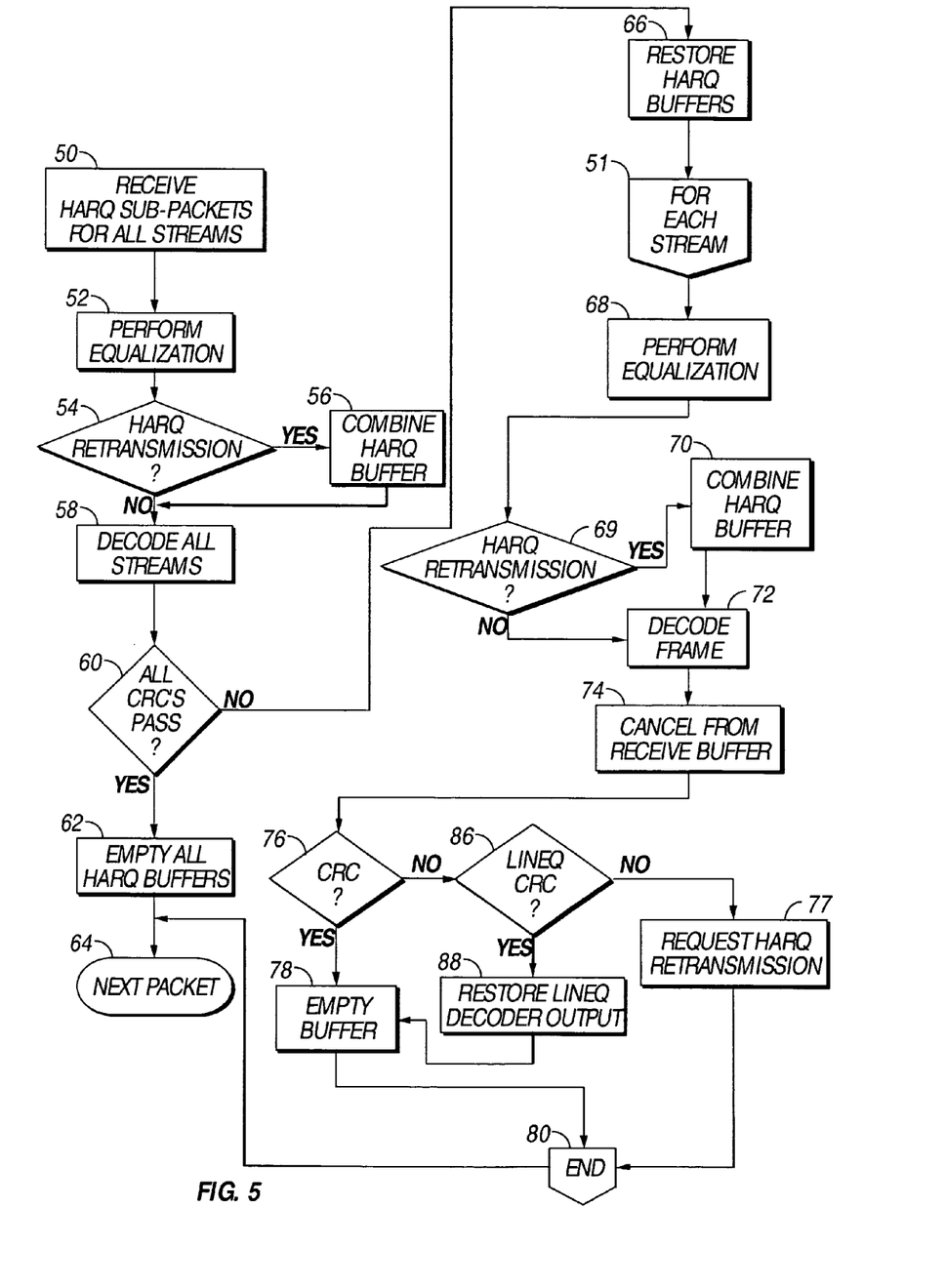
FIG. 5 is a flowchart illustrating a semi-blind interference cancellation technique according to one embodiment of the invention.

One example embodiment of this is illustrated further with in the flowchart of FIG. 5. The process of FIG. 5 contains many of the same steps as set forth in the flowchart of FIG. 3, and these are numbered accordingly. The process again starts by receiving data at block 50. Equalization is performed on the raw data samples at block 52. In this example as well, received data packets are related to a HARQ process, and thus some received data may comprise a HARQ retransmission. This is determined at step 54. If it is a HARQ retransmission, the HARQ content previously stored for a stream is combined with the recently received HARQ sub-packet. After the HARQ data for each stream is appropriately combined where necessary, all the frames are decoded at block 58 and all CRCs are checked at block 60. If all the CRCs pass, all the HARQ buffers are emptied at block 62, and the system moves on to receive the next set of subpackets at block 64.

If some CRC checks fail, the system restores the original HARQ buffer content to the previous state at block 66, and performs a successive interference cancellation process for each stream, as indicated at 51. Once again, equalization is performed at block 68 to produce a set of soft symbols for the first stream, the HARQ buffers are combined as appropriate, the frame is decoded at 72, and the data is reencoded and subtracted from the receive buffer at block 74. However, during the process of interference cancellation, if the linear equalized decoder output passes the CRC check at block 86, but the successive interference cancelled decoder output does not, the linear equalized output is restored at block 88, is passed on for further processing as a valid data frame, and the HARQ buffers are emptied for that stream. This insures that the performance of the blind cancellation procedure can never fall below a pure linear equalized system regardless of the presence of error propagation during interference cancellation.

Figure 6:
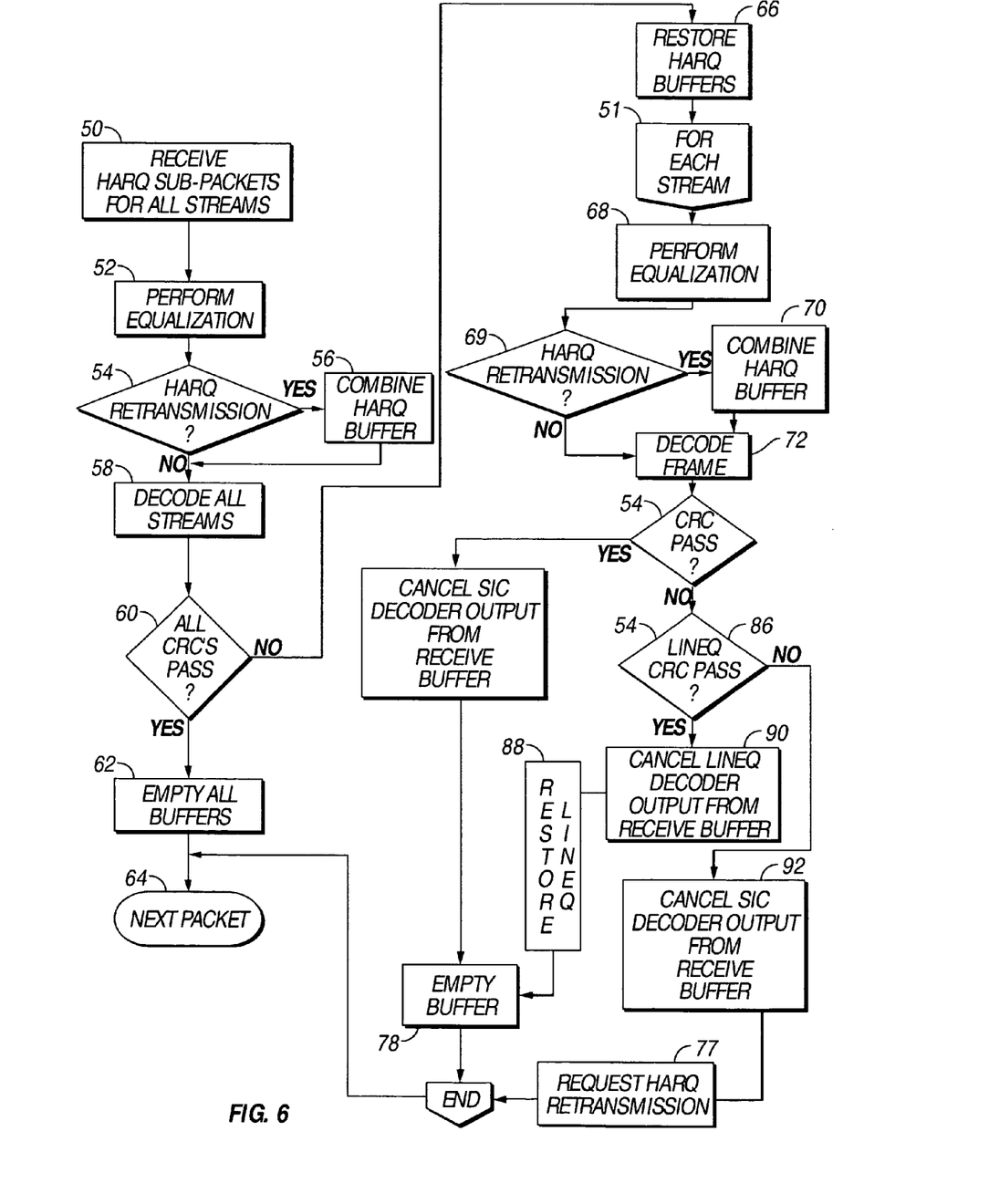
FIG. 6 is a flowchart illustrating a second semi-blind interference cancellation technique according to one embodiment of the invention.

Another modification of this idea is presented in the flow chart of FIG. 6. This process is similar to that in FIG. 5, except if the linear equalized decoder output passes the CRC but the interference cancelled decoder output does not, the linear equalized data is re-encoded and subtracted from the receive buffers at block 90 instead of the interference cancelled decoder output. If neither passes, the successive interference cancelled decoder output is used for further interference cancellation at block 92.

The improvements to signal to noise ratio (SNR) achieved by the interference cancellation techniques can be used to increase throughput. Throughput does not automatically increase with higher data rates. Higher data rates can result in more frequent errors and an increased number of retransmissions. Often, the best throughput is achieved not from the highest data rate or the lowest error rate, but from a relatively good combination of both data rate and error rate that results in a short time for proper decoding.

Figure 7:
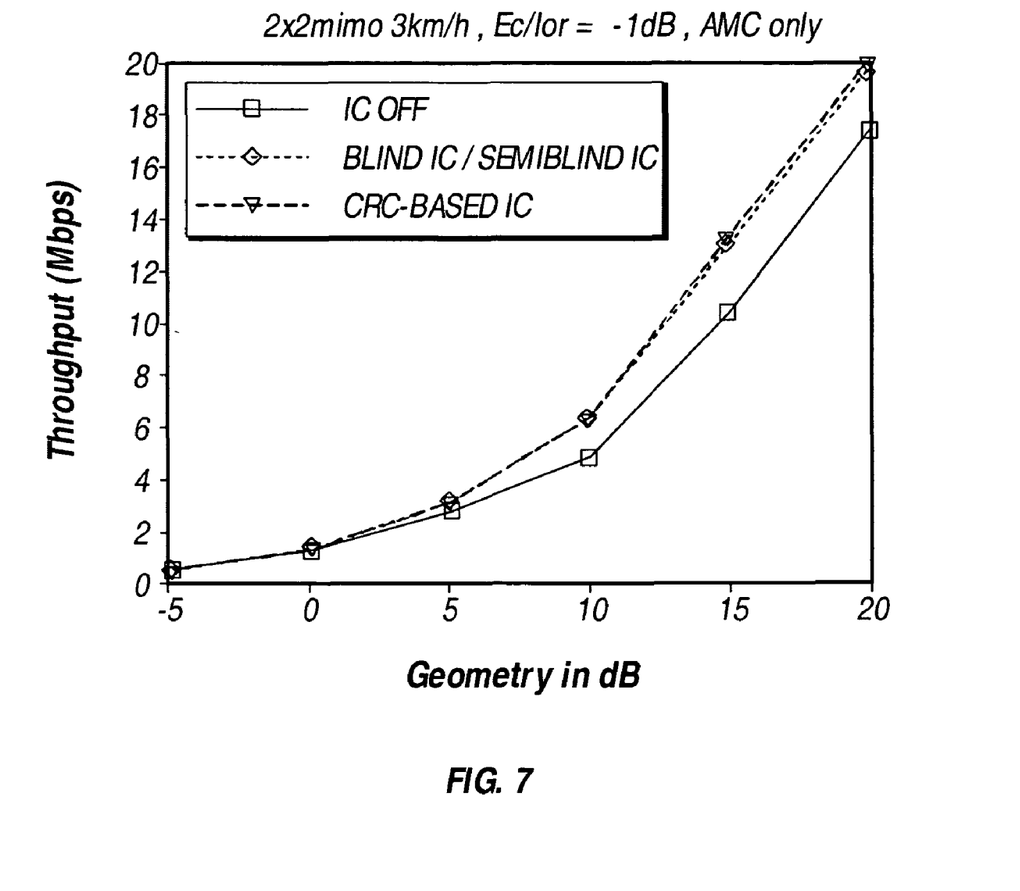
FIG. 7 is a throughput chart from a simulation illustrating the benefits of an embodiment of the invention.

FIG. 7 is a throughput chart from a simulation illustrating the anticipated benefits of an embodiment of the invention in terms of throughput versus geometry. Geometry is indicated along a horizontal axis, and throughput is indicated along a vertical axis. Geometry corresponds to the relative received signal power from the serving base station 100 over the background noise plus other base stations' interference power. A higher figure for geometry indicates that the mobile station 102 is closer to the serving base station 100.

The simulation is of a 2×2 MIMO system using per antenna rate control (PARC) and adaptive modulation coding (AMC). Parameters used include a velocity of 3 kilometer per hour and an Ec/Ior (ratio of data power to total power in the serving base station) of −1 dB. The simulation also assumed a perfect estimation of traffic power based on the pilot power from the base station 100 and assumed an ideal noise estimate. Surprisingly, as illustrated by the particular simulation, the simulated throughput results for blind interference cancellation and semi-blind interference cancellation are virtually indistinguishable from full CRC-based interference cancellation, and these results are achieved with relatively low complexity interference cancellation. The simulation also indicates the benefits to throughput of interference cancellation versus no interference cancellation, as indicated by the much lower throughput with interference cancellation disabled. Simulation results can vary from real-world results and can indicate better or worse results than what may be achieved in the real world. In addition, the results can vary with speed, changes to transmission schemes, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a receiver/equalizer having M signal inputs and N signal outputs, wherein each of said N signal outputs corresponds to a respective one of N received data streams;
   a decoder configured to detect and decode said N signal outputs from said receiver/equalizer to reproduce said N received data streams; and
   an interference cancellation feedback loop configured to successively cancel interference produced in said N received data streams by decoded data stream 1 through decoded data stream N subsequent to at least one decoding of said N signal outputs by the decoder;
   wherein said decoder is configured to detect and decode during the at least one decoding all of said N signal outputs of the receiver/equalizer without successive interference cancellation having been performed thereon by said interference cancellation feedback loop, and to store results of said decoding of said N signal outputs;
   wherein said decoder is further configured to successively detect and decode, subsequent to the at least one decoding, data stream 1 through data stream N with successive interference cancellation having been performed thereon by said interference cancellation feedback loop, and to store results of said decoding of data stream 1 through data stream N; and
   wherein said interference cancellation feedback loop is further configured to select for use in interference cancellation the stored results of said decoding of said N signal outputs if said stored results of said decoding of said N signal outputs pass at least one error checking process and if the stored results of said decoding of data stream 1 through data stream N do not pass the at least one-error checking process.

2. The apparatus of claim 1, wherein said interference cancellation feedback loop is attenuated by a weight of between 0 and 1 to reduce error propagation from incorrectly decoded data streams.

3. The apparatus of claim 1, wherein said apparatus is configured to utilize the stored results of said decoding of said N signal outputs for further data processing and to discard results of said decoding of said data stream 1 through data stream N when said stored results of said decoding of said N signal outputs pass the at least one error checking process and said stored results of said decoding of said data stream 1 through data stream N do not pass the at least one error checking process.

4. A method of decoding N received data streams superposed on one another, said method comprising:
- performing linear equalization of the N received data streams without successive interference cancellation having been performed thereon by a successive interference cancellation feedback loop and decoding said linear equalized N received data streams to produce decoded linear equalized N received data streams;
- subsequently performing a successive interference cancellation using the successive interference cancellation feedback loop on the N received data streams to produce N received data streams having successive interference cancellation, performing a successive linear equalization on the N received data streams having successive interference cancellation, and successively decoding at least some of said N received data streams having successive interference cancellation regardless of whether or not said successive decoding is in error to produce successively decoded N received data streams;
- checking, using an error checking circuit, the decoded linear equalized N received data streams and the successively decoded N received data streams for errors; and
- utilizing for further data processing data of the decoded linear equalized N received data streams if the data of the decoded linear equalized N received data streams passes an error checking process and data of the successively decoded N received data streams if the data of the successively decoded N received data streams fails an error checking process.

5. The method of claim 4, wherein one or more of said N received data streams are formed by a series of sub-packets that are combined in a Hybrid Automatic Repeat Request (HARQ) process.

6. A method of decoding N received data streams superposed on one another, said method comprising:
- performing linear equalization of the N received data streams without successive interference cancellation having been performed thereon by a successive interference cancellation feedback loop to produce linear equalized N received data streams, decoding said linear equalized N received data streams to produce decoded N received data streams, and storing said decoded N received data streams to produce stored N received data streams;
- subsequently performing a successive interference cancellation using the successive interference cancellation feedback loop on the N received data streams to produce N received data streams having successive interference cancellation, performing a successive linear equalization on the N received data streams having successive interference cancellation, and successively decoding at least some of said N received data streams having successive interference cancellation regardless of whether or not said successive decoding is in error to produce decoded N received data streams having successive interference cancellation; and
- selecting for use in interference cancellation stored data from said stored N received data streams, if said stored data from said stored N received data streams passes an error checking process and if corresponding data from said decoded N received data streams having successive interference cancellation does not pass an error checking process.

7. A communication system comprising:
- a transmitter comprising two or more antennas configured to transmit respective data streams;
- a receiver comprising two or more antennas configured to receive said respective data streams;
- an equalizer comprising a filter with a weight determined from a channel characteristic from the transmitter to the receiver, the equalizer configured to produce soft decision output data using said respective data streams;
- a data combiner/decoder configured to combine said respective data streams with previously received unsuccessfully decoded data and produce respective streams of decoded hard decision output data;
- a successive interference cancellation feedback loop configured to perform successive interference cancellation on said respective data streams input to the equalizer;
- wherein said data combiner/decoder is further configured to detect and decode all of the respective data streams received from the equalizer without successive interference cancellation having been performed thereon by the successive interference cancellation feedback loop, and to store first results of said decoding of the respective data streams without successive interference cancellation having been performed thereon by the successive interference cancellation feedback loop;
- wherein said data combiner/decoder is further configured to successively detect and decode all of the respective data streams received from the equalizer with successive interference cancellation having been performed thereon by the successive interference cancellation feedback loop, after said decoding of the respective data streams without successive interference cancellation having been performed thereon by the successive interference cancellation loop, and to store second results of said decoding of the respective data streams with successive interference cancellation having been performed thereon by the successive interference cancellation feedback loop; and
- wherein said successive interference cancellation feedback loop is further configured to select for interference cancellation the stored first results if said stored first results pass at least one error checking process and said stored second results do not pass the at least one error checking process.

8. The system of claim 7, wherein said transmitter is configured to conservatively control a transmit data rate so as to reduce occurrence of error propagation in the receiver due to interference cancellation with inaccurately decoded data streams.

9. The system of claim 8, wherein said transmitter is configured to conservatively control a transmit data rate so as to reduce an error rate in a first sub-packet of a Hybrid Automatic Repeat Request (HARQ) process.

10. A communication apparatus comprising:
- two or more antennas for receiving respective data streams;
- means for producing soft decision output data using said respective data streams;
- means for detecting and decoding all of said respective data streams, the means for detecting and decoding including means for combining said respective data streams with previously received unsuccessfully decoded data and decoding said respective data streams to produce decoded hard decision output data; and
- means for performing successive interference cancellation on said respective data streams input to the means for producing soft decision output data after at least one instance of said means for detecting and decoding producing first respective streams of decoded hard decision output data from data streams input into said means for producing soft decision output data without said means for performing successive interference cancellation having performed successive interference cancellation thereon;

wherein the means for detecting and decoding all of said respective data streams is configured to store said first respective streams of decoded hard decision output data;

wherein the means for detecting and decoding all of said respective data streams is further configured to store second respective streams of decoded hard decision output data produced from data streams input into said means for producing soft decision output data with successive interference cancellation performed thereon by the means for performing successive interference cancellation; and means for selecting for said successive interference cancellation the stored first respective streams of decoded hard decision output data if said stored first respective streams of decoded hard decision output data passes at least one error checking process and if the stored second respective streams of decoded hard decision output data does not pass the hard decision output data error checking process.

11. The apparatus of claim 10, further comprising means for attenuating said second respective streams of decoded hard decision output data to reduce error propagation produced by incorrectly decoded data streams.

* * * * *